No. 784,299. PATENTED MAR. 7, 1905.
J. A. BRILL.
MOTOR PROPULSION TRUCK FOR STREET CARS OR SIMILAR VEHICLES.
APPLICATION FILED NOV. 29, 1902.

4 SHEETS—SHEET 1.

WITNESSES:

INVENTOR
John A. Brill.
BY
ATTORNEY

No. 784,299. PATENTED MAR. 7, 1905.
J. A. BRILL.
MOTOR PROPULSION TRUCK FOR STREET CARS OR SIMILAR VEHICLES.
APPLICATION FILED NOV. 29, 1902.

4 SHEETS—SHEET 2.

WITNESSES:
C. W. Benjamin

INVENTOR
John A. Brill.
BY Joseph L. Levy
ATTORNEY

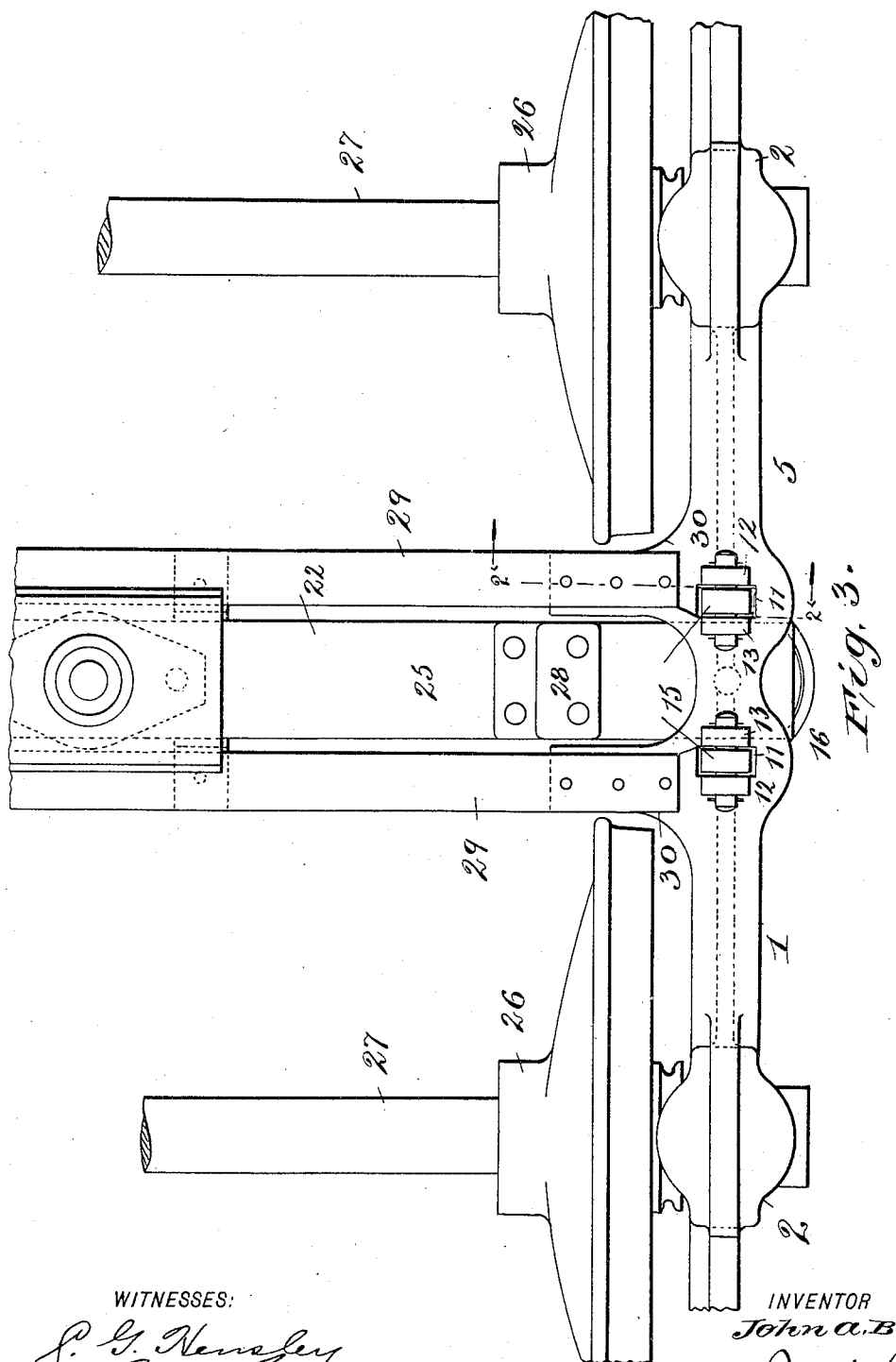

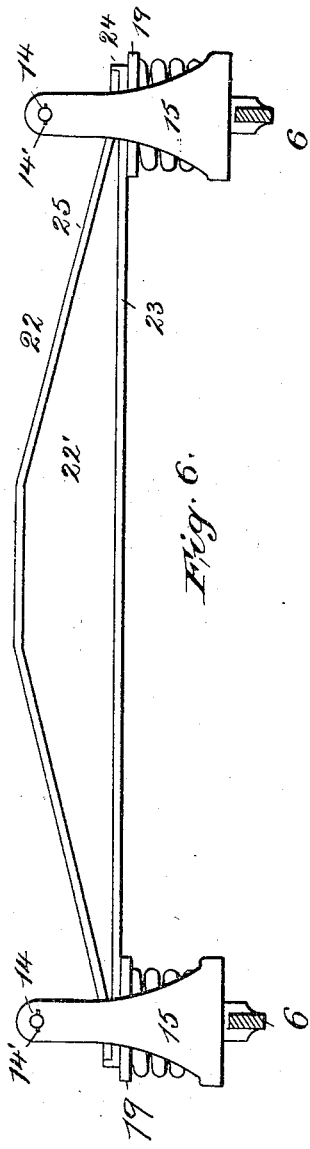
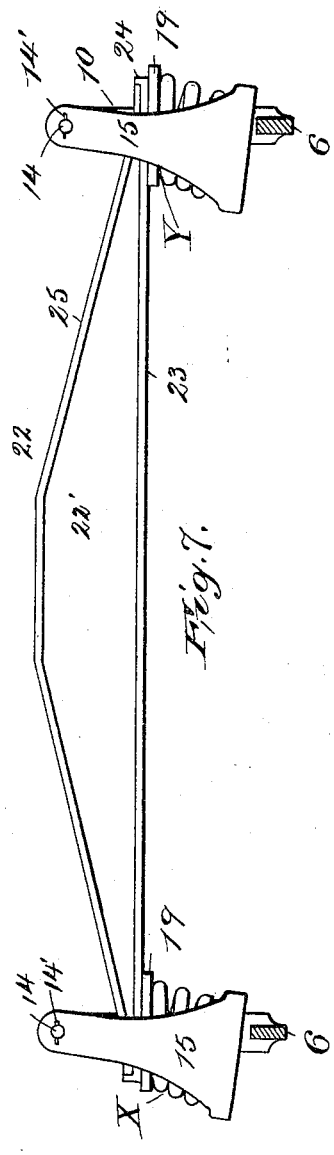

No. 784,299. Patented March 7, 1905.

UNITED STATES PATENT OFFICE.

JOHN A. BRILL, OF PHILADELPHIA, PENNSYLVANIA.

MOTOR-PROPULSION TRUCK FOR STREET-CARS OR SIMILAR VEHICLES.

SPECIFICATION forming part of Letters Patent No. 784,299, dated March 7, 1905.

Application filed November 29, 1902. Serial No. 133,175.

*To all whom it may concern:*

Be it known that I, JOHN A. BRILL, a citizen of the United States, and a resident of Philadelphia, county of Philadelphia, and State of Pennsylvania, have invented a certain new and useful Motor-Propulsion Truck for Street-Cars or Similar Vehicles, of which the following is an exact description, which will enable others skilled in the art to make and use the same.

The object of my invention is to so improve this form of truck that all vibrations of the car due to the action of the brakes, inequalities of the truck, or other causes will be minimized, and this I accomplish by suspending stirrups in the side frames and connecting a bolster with the stirrups through coiled springs.

For a more particular description of my invention reference is to be had to the accompanying drawings, forming a part of this specification, in which—

Figure 1:
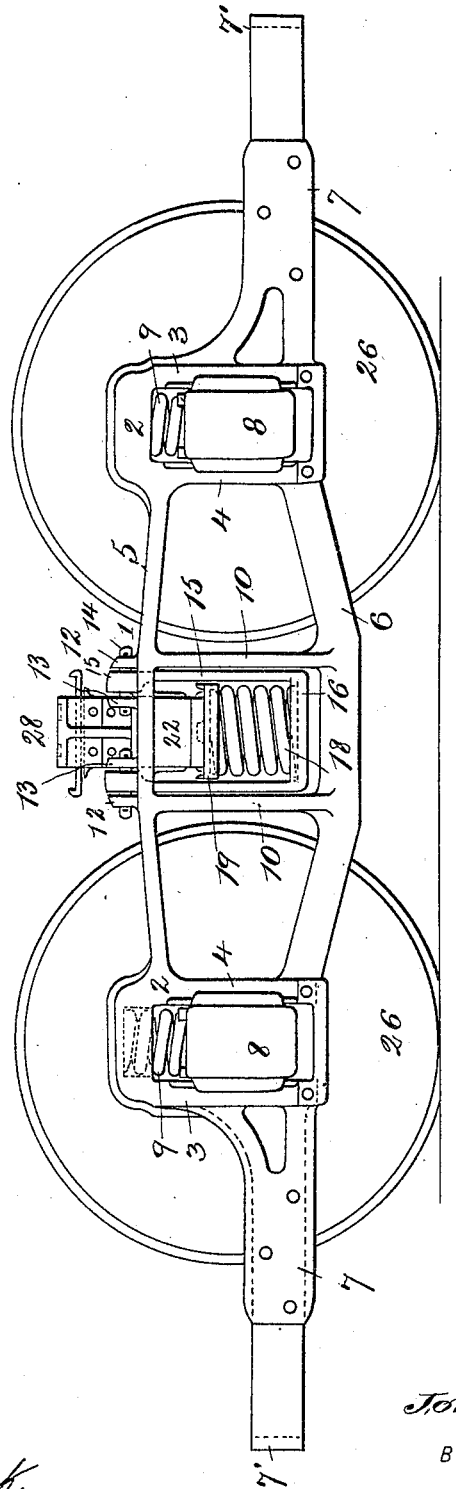
Figure 2:
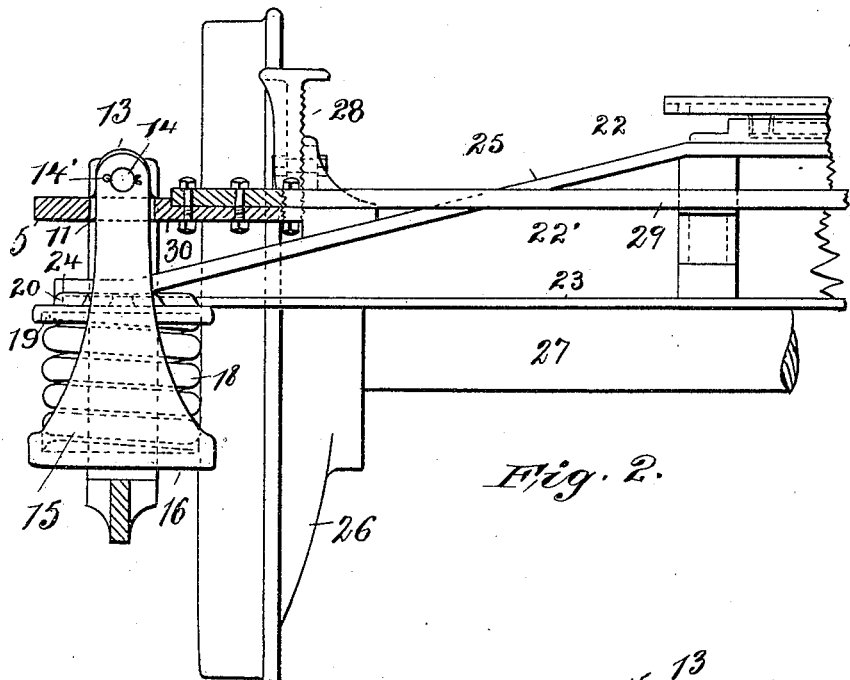
Figure 4:
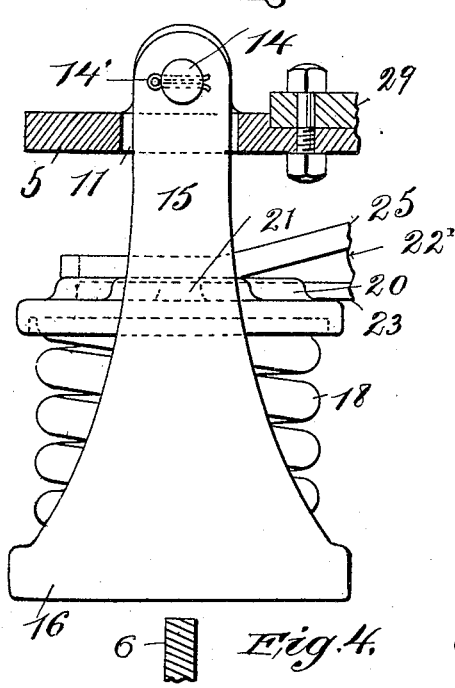
Figure 5:
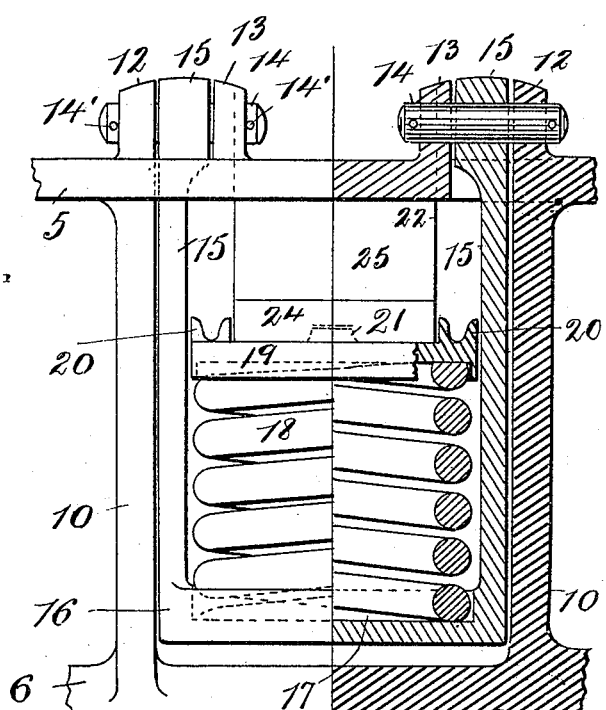

Figure 1 is a side elevation of a truck embodying my invention. Fig. 2 is a sectional view taken on the line 2 2 of Fig. 3, a little more than half the truck being shown. Fig. 3 is a plan view of the truck. Figs. 4 and 5 are views of the stirrup and connecting parts; and Figs. 6 and 7 are diagrammatic views illustrating the action of the bolster, springs, and stirrups.

Similar reference characters designate similar parts throughout the several views.

The truck is constructed with the usual side frames 1, which may be either castings or forgings and may be of any well-known type, with such changes as are necessary to enable my invention to be applied thereto. Near the end of the frames are the usual yokes 2, provided with the axle-box-controlling arms 3 and 4, and the yokes are connected by the upper and lower chords 5 and 6. Between the limits of the arms 3 are the extensions 7, extending outwardly and connected by any well-known type of cross-bars 7', which may be provided with means to support the motors. Axle-boxes 8 slide between the arms 3 and 4, thus supporting the frame 1, through springs 9, on the axles 27 of the wheels 26, all of which is customary in such structures. Near their centers the chords 5 and 6 are connected by means of integral frame tie-rods 10, and between said rods and immediately adjacent thereto are openings 11 in the upper chord 5, and at each side of this opening are pivot-supports 12 and 13, which are also integral with the chord 5. Passing through the supports 12 and 13 are the pivots 14, which are retained in place by the cotters 14', and mounted by these pivots are stirrups 15, provided with bottoms 16, having spring-supporting recesses 17, in which rests one end of a bolster-spring 18, the other end supporting a cap 19. The upper surface of the cap 19 has integral ribs 20 and a center 21, which prevent the superimposed bolster 22 from becoming displaced on the cap 19. The bolster may be of any well-known type, though preferably it is constructed with a wooden filling 22', a lower bar 23 bent upward at 24 to fit an arch-bar 25, which rests on the core and at its center has a flat portion which receives the usual center-bearing. Adjacent to the outer ends of the bolster are side bearings 28. Integral with the chord 5 are projections 30, to which transoms 29 are riveted or otherwise rigidly secured and are connected with the bolster in the manner described in the copending application of Walter S. Adams, Serial No. 133,218 and filed November 29, 1902. Any irregular vibration of the frames 1 due to defects in the road-bed or other causes will be transmitted to the bolster-spring 18 in its stirrup 15, and as this is pivoted to swing transversely of the side frame it readily supports the spring in any position the stresses upon it force it to assume, and so enable it to eliminate or greatly reduce the vibrations before they reach the bolster. This combination has the additional advantage of causing the stirrups to resume their normal position as soon as any displacing force is removed. To make this clear, reference is had to the diagrams in Figs. 6 and 7. In Fig. 6 the bolster-springs and stirrups are indicated in their normal positions. In Fig. 7 the direction of the forces is changed so that the stirrups swing transversely. The springs swing with the stirrups, and as the bolster always swings parallel to itself the sides of the springs in the direction of motion are put under greater tension than at any other part, as shown at X and Y in Fig. 7. This abnormal stress on one side of the spring causes the stirrup to swing back to its normal position whenever the strength of the spring is sufficient to overcome the deflecting force.

While I have shown and described one modification of my invention, I wish it to be understood that I regard all devices within the scope of my invention which support springs and bolsters so that whenever the supports are moved or turned on their pivots the springs are unevenly deflected and cause the said supports to resume their normal positions whenever the springs are able to overcome the deflecting forces.

From the above it is evident that when transverse stresses are put on the truck due to irregularities in the track or other causes the springs automatically assume a position where they can act with maximum effect to reduce vibrations and their uneven distortion causes them to resume their normal positions whenever the stresses are removed.

Having described my invention, what I claim is—

1. In a car-truck, the combination of the bolster with springs and automatic means for sustaining said springs with their axes approximately coinciding with the stresses put upon them.

2. In a car-truck, the combination of the bolster with springs, supports for said springs, and automatic means for placing and sustaining said supports in a plane normal to the stresses of the springs.

3. In a car-truck, a bolster, springs supporting said bolster and suspended means whereby all transverse stresses cause an uneven distortion of the springs, thereby causing them to resume their normal positions and reducing all transverse vibrations.

4. In a car-truck, a bolster, springs supporting said bolster, pivoted and suspended means for supporting said springs so that when said means operate the springs will be unevenly distorted, and thereby caused to resume their normal position.

5. In a car-truck, a bolster, springs supporting said bolster, pivoted stirrups supporting said springs, and means connecting the bolster and springs so that whenever the stirrups turn on their pivots, the springs will be unevenly distorted thereby tending to cause the stirrups to resume their normal position.

6. In a car-truck, a bolster, springs supporting said bolster, and means supporting said springs so that they will automatically assume a position wherein their axes will coincide with the direction of the stress put upon them, so that they will resist transverse vibrations with maximum effect.

7. In a car-truck, the bolster, springs supporting said bolster, and suspended means for moving said springs out of their normal position, so that they will be unevenly deflected whenever transverse stresses are applied to the bolster.

8. In a car-truck, a bolster, springs supported by suspended means and adapted to be unevenly deflected by transverse stresses on the truck, whereby said uneven deflection will cause the bolster and springs to resume their normal position when said stresses are removed.

9. In a car-truck, a bolster which is spring-supported in a pivoted stirrup so that when the stirrup swings on its pivot, the axes of the spring will be inclined to the vertical.

10. In a car-truck, a frame, a stirrup pivotally supported in said frame, a spring resting on said stirrup, a cap on the spring, and a bolster supported by the cap.

11. In a car-truck, a side frame, a stirrup pivotally mounted in said frame, a recess in the bottom of said stirrup, and a bolster-spring resting in said recess.

12. In a car-truck, a side frame, a stirrup pivotally mounted in said frame, a spring supported by said stirrup and a cap resting on said spring.

13. In a car-truck, a side frame, a pivotally-mounted stirrup provided with a spring-receiving recess in its lower portion, a spring seated in said recess, and a cap on said spring provided with projections adapted to fit a bolster so that when the stirrup swings on its pivot, the axes of the spring will be inclined to the vertical.

14. A stirrup provided in its upper portion with a pivot and in its lower with a spring-receiving recess, a spring in said recess and a cap on said spring so that when the stirrup swings on its pivot, the axes of the spring will be inclined to the vertical.

15. In a side frame for a truck, chords, frame tie-rods uniting said chords, perforations in one chord between the said rods, and pivot-supports on two sides of each perforation.

16. In a side frame for a truck, chords, frame tie-rods uniting said chords, perforations in one chord between the said rods, pivot-supports on two sides of each perforation, and a stirrup pivoted in said supports.

17. A cap provided with two transverse projections and one central projection.

18. In a side frame for a truck, upper and lower chords and a stirrup pivoted to lugs above said chords and swinging between them.

19. In a side frame for a truck, chords, frame tie-rods uniting said chords, and a stirrup pivoted to lugs above said chords and swinging between them and also between the said tie-rods.

20. In a side frame for a truck, an upper chord, a stirrup suspended therefrom by means of lugs extending above said chord, a spring resting in said stirrup and a bolster supported by said spring.

21. In a side frame for a truck, upper and lower chords, side-frame tie-rods uniting said chords, a stirrup pivoted to said upper chord by means of lugs extending above the same, a spring in said stirrup, and a bolster supported by said spring.

22. In a side frame for a truck, an upper chord, a stirrup suspended therefrom by means of lugs extending above said chord and a spring supported by said stirrup.

23. In a side frame for a truck, upper and lower chords, side-frame tie-rods uniting said chords, a stirrup pivoted to said upper chord by means of lugs extending above the same, and a spring in said stirrup.

24. The combination, with a bolster and suitable supports, of suspended rockers arranged between the bolster and supports, and springs also arranged between the bolster and supports and coöperating with the rockers, the upper ends of the springs having a fixed relation with respect to the bolster.

25. The combination with a bolster and suitable supports, of suspended rockers interposed between said supports, and bolster, and springs also interposed between such supports and bolster, and arranged in a normally vertical position, said springs having a fixed relation with respect to the bolster.

26. The combination with a bolster and suitable supports, of suspended plates arranged to rock on said supports, and springs arranged in a normal vertical position between the bolster and plates, and having fixed relation with respect to the bolster.

Signed at the city of Philadelphia, county of Philadelphia, and State of Pennsylvania, this 21st day of November, 1902.

JOHN A. BRILL.

Witnesses:
TERRENCE McCUSKER,
WM. J. FERDINAND.